United States Patent [19]

Kelch

[11] Patent Number: 4,724,860
[45] Date of Patent: Feb. 16, 1988

[54] FLOAT CONTROLLED VALVE ASSEMBLY

[75] Inventor: Heinz Kelch, Konigsfeld, Fed. Rep. of Germany

[73] Assignee: Mannesmann Kienzle GmbH, Villingen-Schwenningen, Fed. Rep. of Germany

[21] Appl. No.: 847,207

[22] Filed: Apr. 2, 1986

[30] Foreign Application Priority Data

Apr. 3, 1985 [DE] Fed. Rep. of Germany ....... 3512191

[51] Int. Cl.⁴ ............................................. F16K 31/24
[52] U.S. Cl. ....................................... 137/196; 137/433
[58] Field of Search ................ 137/399, 433, 450, 196

[56] References Cited

U.S. PATENT DOCUMENTS

| | | | |
|---|---|---|---|
| 976,055 | 11/1910 | Duram | 137/196 |
| 1,182,873 | 5/1916 | Fisher | 137/433 |
| 1,473,714 | 11/1923 | Weidner | 137/450 |
| 1,623,811 | 4/1927 | Pownall | 137/450 |
| 1,851,016 | 3/1932 | Skelly | 137/450 |
| 2,043,074 | 6/1936 | Simpson | 137/196 |
| 2,264,845 | 12/1941 | How | 137/450 |
| 2,399,111 | 4/1946 | George | 137/196 |
| 2,540,361 | 2/1951 | Whitley | 137/450 |
| 2,709,451 | 5/1955 | La Bour | 251/58 |

FOREIGN PATENT DOCUMENTS 2932014 9/1980 Fed. Rep. of Germany .

Primary Examiner—Gerald A. Michalsky
Attorney, Agent, or Firm—Toren, McGeady & Associates

[57] ABSTRACT

A valve assembly controlled by a float permits pressure-free feed of a fluid into a pipeline system, the valve being assigned in operative relationship with a channel which is arranged in the base of the tank containing the float, the channel extending laterally to the normal axis of the tank. The valve is designed as a dual valve with two valve members arranged on a valve rod guided in the direction of the axis of the tank and the channel is defined through a pair of apertures lying opposite each other in the direction of the axis of the tank with valve seats being located about the apertures, the valve members arranged on the valve rod operating to engage and disengage the valve seats to open and close the apertures.

4 Claims, 3 Drawing Figures

FLOAT CONTROLLED VALVE ASSEMBLY

The present invention is directed generally to valve mechanisms and more particularly to a float controlled valve assembly including a tank with a gas or vapor exchange aperture, an aperture for liquid supply and a base or support member. The tank affords a floatation area for a float and the valve provides a nonpressurized supply of the contents of the tank into a channel which is oriented laterally to the normal axis of the tank.

If, in the art to which the present invention relates, it is necessary to realize supply of a fluid into a pipeline system, depending on the feed or inflow or a feed of a fluid into a pipe system depending on consumption, then it is usual to solve this problem with a float control valve. This permits control of supply throughout a relatively wide flow range which, in the final analysis, represents the decisive assumption for a continuous throughflow momentary value indication. A typical utilization example for such a valve exists, as is commonly known in the art, in an operating system of a diesel motor, wherein the operating system is laid out for fuel consumption measurement.

In general, such an operational system provides, in a case where no difference measurement is made, a fuel cycle designated as an injection cycle with a relatively large circulating amount compared with the usual injection amount which exercises a scavenging or flushing function. Into this fuel cycle, merely the fuel amount utilized by the injection pump is post-aspirated from the fuel reservoir through a suction line in which the throughput measuring instrument is also built in. Such an operational system, depending on the injection mode, for example, in the case of Cummins motors and when utilizing distributor injection pumps and diaphragm actuated pumps, requires the use of a gas separator built into the injection cycle. This occurs because the usual expelling of gas from the excess fuel amount and the fuel reservoir is no longer possible in this case.

On the other hand, the suggestion seems evident to arrange a float in the tank provided for gas separation and to control the valve assigned to the tank, through which the fuel return flow, depending on the injection amount, is fed back into the suction line, by means of a float. The desired continuous regulation of return feed is, however, problematic insofar as fuel flow rate between zero and the maximum value is involved which should be controllable with a smaller float rise as possible, and, thus, with as low a hysteresis as possible. However, on the other hand, quite apart from the fact that the return flow often occurs in a surge, considerable suction is applied to the valve emanating from the fuel supply pump so that, in particular, in the range of the closed position of the valve, resonance phenomena and breakdown effects occur which cause an uneven indication of momentary values.

It has been attempted in the prior art in accordance with DE-PS No. 29 32 014 to overcome this problem by utilizing a soft, elastic diaphragm for the closing member of the valve connected with the float with which a gradual opening of the valve may occur by upward bend-through during a rise of the float.

However, with this solution, a certain overrun of the rise is required for closing the valve opening. In addition, because of the suction of the fuel supply pump, to begin with, a stretching and dilation of the diaphragm occurs when opening the valve. Then, although in a weakened manner, there occurs a breakdown whereby this valve is not free of hysteresis effects, requires a relatively long opening stroke and causes an inaccurate momentary value indication quite apart from the fact that a higher structural shape of the float tank is required.

Accordingly, the present invention is directed toward the task of providing a return flow feed valve, wherein the disadvantages discussed above are avoided. The invention operates to accomplish the advantages thereof by means of compensation of the suction effect of the fuel supply pump. The valve of the present invention permits feed of the return flow mass to be regulated into the suction channel with as small a stroke or excursion as possible.

SUMMARY OF THE INVENTION

Briefly, the present invention may be described as a float controlled valve assembly comprising a tank having therein a float with a gas exchange aperture and a base having a channel designed therein in a direction extending transversely to the normal tank axis. An aperture for liquid feed is provided which permits a pressure-free feed of the contents of the tank into the channel and a pair of apertures are arranged lying opposite each other in the direction of the normal tank axis for placing the channel in fluid flow connection with a tank space defined within the tank. A valve rod is coupled with the float in an articulated manner and is displaceably guided in the direction of the tank axis and a pair of valve seats, both pointing in the same direction, are arranged each, respectively, about one of the apertures. Valve sealing members are arranged on the valve rod and each of the sealing members cooperate respectively with one of the valve seats to open and close the apertures.

In accordance with the present invention, the channel is in fluid connection with the tank contents by means of the two apertures which lie opposite each other and the valve seats pointing in the same direction are assigned to the apertures so that the valve sealing members will cooperate with the valve seats when they are actuated by the valve rod which is coupled with the float and which is displaceably guided in the direction of the normal axis of the tank.

In accordance with a preferred embodiment of the invention, at least one valve seat is designed as a hollow screw which can be threaded into the base, with the hollow screw being assigned to the aperture of the channel lying nearest to the float. A relief area is assigned on a back side of the valve seat of the other aperture of the channel and constitutes a chamber together with a cover which is connected with the tank space by means of channels.

A significant advantage provided by the present invention is to be found in that the suction effect of the fuel supply pump is obviated by the use of the dual valve, whereby the feed of the fuel return flow occurs essentially pressure-free. In accordance with this aspect of the invention and apart from the fact that two valve apertures are provided, relatively large valve cross sections may be selected, whereby also, in the case of a surge-like return flow, a minimum float rise, and operation which is practically free from hysteresis, and, therefore, a sufficiently accurate momentary value indication may be achieved.

Furthermore, of significant importance is the accurate support of the valve rod and the circumstances under which the two individual valves of the dual valve can be adjusted in position relative to each other by means of a hollow screw so that the fabrication and installation tolerances can be compensated in a simple manner. Furthermore, the invention enables utilization of simple disk-type sealing members acting without overtravel and stretching effects, and, thus, despite the use of a dual valve, a relatively low constructional height can be achieved.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
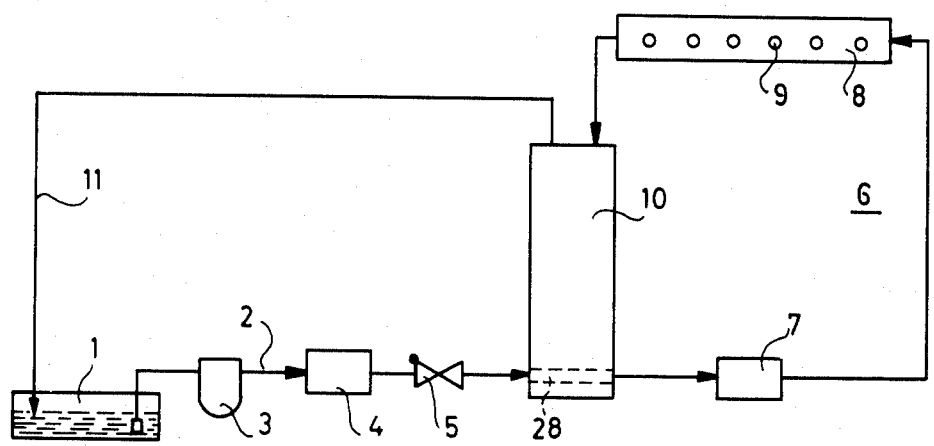
FIG. 1 is a schematic diagram showing a diesel motor operational system having an injection cycle with a flow meter arranged in the suction area.

Referring now to the drawings, and particularly to FIG. 1, there is shown schematically a diesel motor operating system including a fuel reservoir 1 and a suction line 2 which leads into the fuel reservoir 1. The suction line 2 includes a filter 3, a flow meter 4 and a check valve 5. The system also includes an injection circut 6 including a fuel pump 7, an injection pump 8 including injection nozzles 9 and a tank 10 having a gas separator. In the injection circuit 6, a specific relatively large fuel mass, as compared to the injection mass, is kept in circulation.

A gas line 11 connects the fuel reservoir 1 and the gas separator tank 10.

Figure 2:
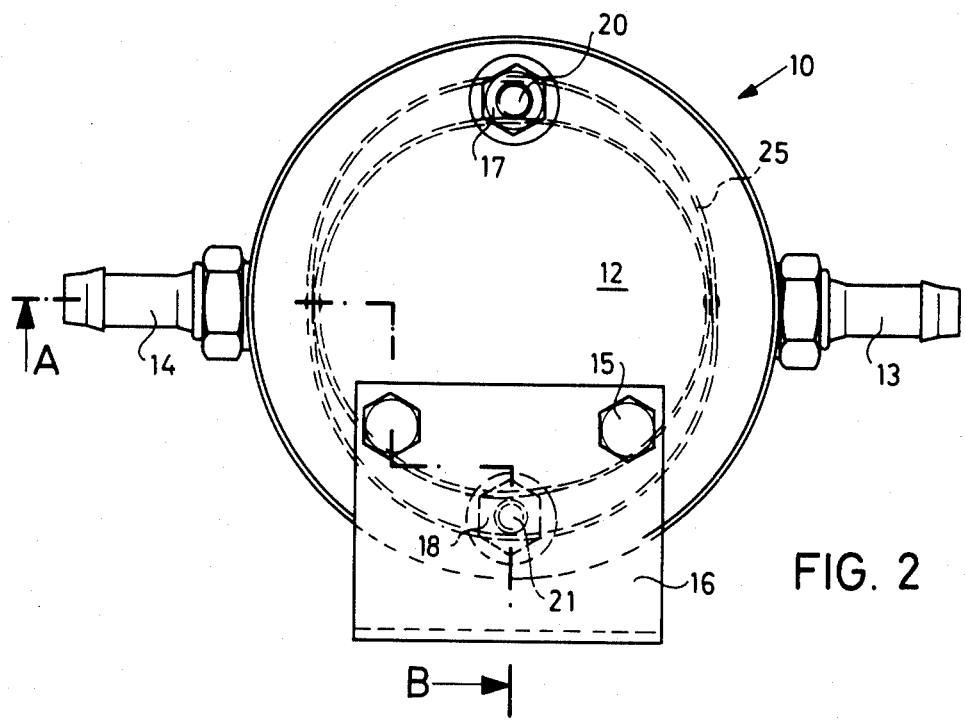
FIG. 2 is a plan view of a tank operating as a gas separator.

In FIG. 2, the tank 10 is shown in plan view as including a cover 12. The tank 10 is essentially cylindrical in configuration and includes hose connection means 13 and 14 at which, on the one hand, the tie-in of the return flow branch of the injection cycle emanating from the injection pump 8 and, on the other hand, the gas line 11 are attached. A U-shaped fixture 16 is furthermore assigned to the tank 10 which is fastened by means of screws, one of which is designated by reference numeral 15. By means of the fixture 16, the tank 10 can be attached at a suitable location in the engine compartment of the vehicle. Nuts 17 and 18 embedded in the cover 12 operate to attach the cover 12 onto supports 20 and 21 fastened in a base 19 (FIG. 3) of the tank 10.

Figure 3:
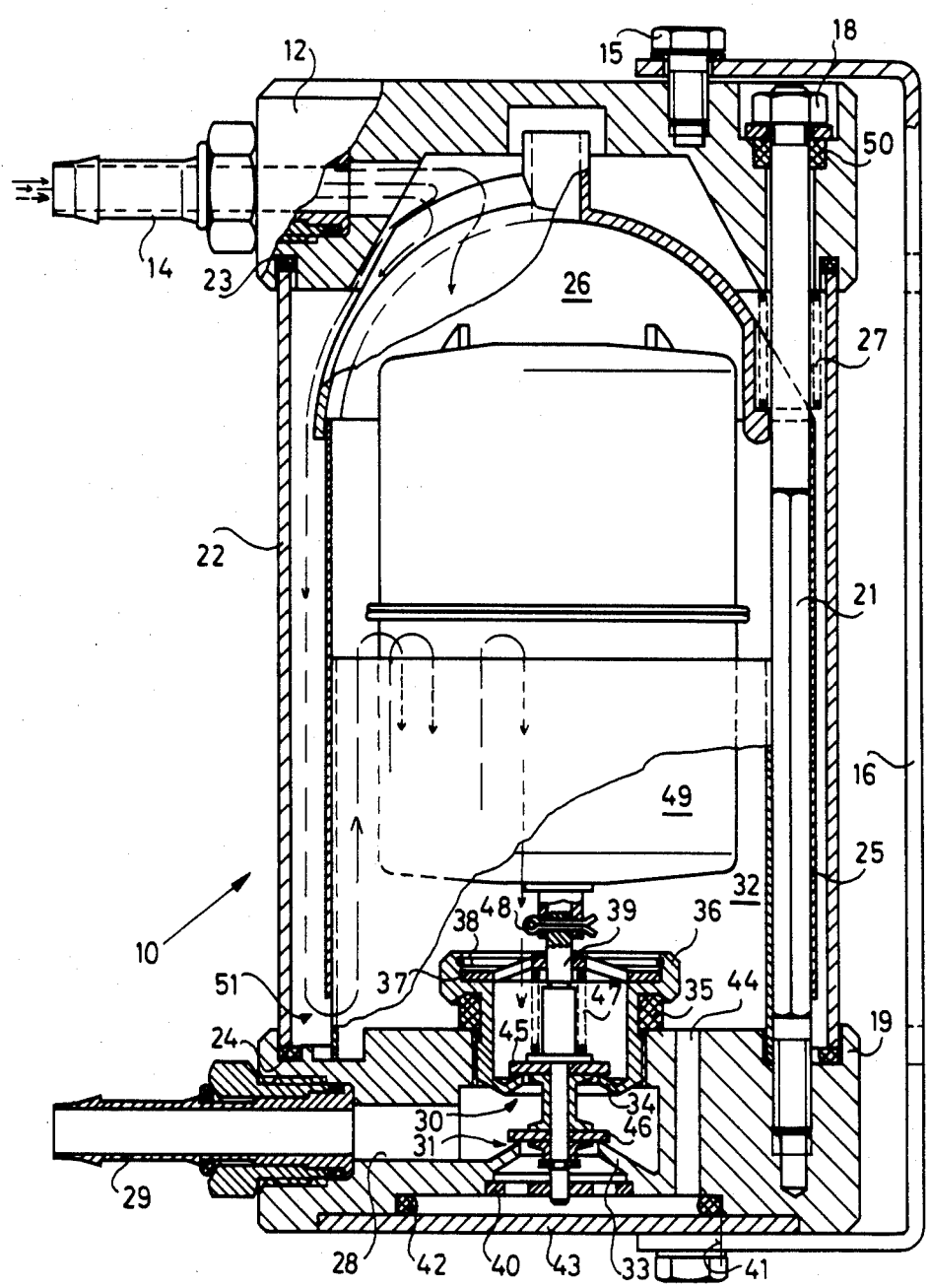
FIG. 3 is a longitudinal sectional view of the tank taken along the line A-B of FIG. 2.

In the sectional view depicted in FIG. 3, it will be seen that the tank 10 essentially consists of a sleeve 22, a part of the cover 12 and the base 19, which is retained between the cover 12 and the base 19 with the interposition of seals 23 and 24. Apart therefrom, the tank 10 contains a double-walled sleeve 25 with which, in order to achieve adequate de-gassing, the returning fuel is redirected and flow travel is lengthened, as well as the baffle cupola 26, which, together with the sleeve 25, is retained on the supports 20 and 21 under the action of a pair of springs, of which, spring 27 is depicted in FIG. 3.

Furthermore, as will be seen from FIG. 3, there is provided a channel 28 which extends transversely to the normal axis of the tank 10. The channel 28 is formed within the base 19 and by means of hose connections, of which one is depicted and designated with reference numeral 29, it can be switched in between the suction line 2 and the injection cycle 6. The channel 28 comprises two apertures 30 and 31 arranged in the direction of the normal axis of the tank 10 which establish a flow connection between it and the tank space 32. At one aperture 31, a first valve seat 33 is formed, while a second valve seat 34 is formed on a hollow screw member 36 which is insertable into the base 19 with the interposition of a seal 35. The hollow screw member 36 is provided with a knurled collar and further serves for receiving a support plate 37 provided with openings, the plate 37 being retained in the hollow screw member 36 by means of a spring washer 38 and in which a support point of a valve rod 39 is located. The second support point of the valve rod 39 is provided in a support plate 40, also equipped with through apertures which is inserted into a relief area 41 assigned to the opening 31 or to the rear side of the valve seat 33 provided at the opening 31. The relief area 41 constitutes a chamber together with a covering 43 attached in a fluid-tight manner at the base 19 by a seal 42. The chamber is in connection with the tank space 32 by means of several channels, of which, one channel 44 is shown in FIG. 3.

Furthermore, FIG. 3 shows that a pair of disk-shaped valve or sealing members 45 and 46 are arranged on the valve rod 39 and that the valve rod is under the action of a pressure spring 47 arranged in the hollow screw member 36. The rod 39 is connected by means of a cotter pin 48 in an articulated manner with a float 49 which occupies most of the tank space 32.

One of two seals 50 is assigned to the supports 20 and 21. The pressure spring 47 is dimensioned to apply a relatively small spring force essentially for providing the float controlled valve with a certain basic load since the valve, when it is used in motor vehicles, becomes subject to high shocks.

In addition, it should also be noted that the excess fuel flowing back from the injection pump 8, which, for example, flows into the gas separator tank 10 through the hose connection 14, first of all, (as shown by the broken line arrows) impinges upon the baffle cupola 26 and disperses itself and flows away between the sleeve 22 and the outer wall of the double-walled sleeve 25. An annular aperture 51 provided in the double-walled sleeve 25 provides access into the intermediate space between the walls of the sleeve 25 where the excess fuel again rises, overflows into the tank space 32, and finally enters the channel 28 through the dual valve 34/45, 33/46. As a result, uneven flow resistance and flow-out conditions are avoided by means of a multiplicity of channels 44 and the relief area 41.

It should further be noted that the check valve 5 may, for example, also be integrated into the channel 28 or into the hose connection 29. Thus, it will be seen that the present invention provides a valve controlled by a float which permits a pressure-free feed of fluid into a pipeline system. The valve is assigned to a channel 28 which is arranged in the base 19 of a tank 10 containing the float 49. The channel 28 is arranged to extend laterally or transversely to the normal axis of the tank and in such a manner, that the valve is designed as a dual valve with two sealing members 45 and 46 arranged on a valve rod 39 guided in the direction of the axis of the tank 10. The channel 28 exhibits two apertures 30 and 31 lying opposite each other in the direction of the normal axis of the tank 10, to which are assigned valve seats 33 and 34, each pointing in the same direction.

While specific embodiments of the invention have been shown and described in detail to illustrate the application of the inventive principles, it will be understood that the invention may be embodied otherwise without departing from such principles.

What is claimed is:

1. A float controlled valve assembly comprising
a tank defining a floatation area and having a tank axis;
a float with a gas exchange aperture operatively arranged in said floatation area;
a base having a channel designed therein in a direction transversely to said tank axis;
an aperture for liquid feed which permits a pressure-free feed of the contents of said tank into said channel;
a pair of apertures lying opposite each other in the direction of said tank axis for placing said channel in fluid flow connection with a tank space defined within said tank;
a valve rod coupled with said float in an articulated manner and displaceably guided in the direction of said tank axis;
a pair of valve seats, both pointing in the same direction, each arranged, respectively, to define one of said apertures;
valve sealing members arranged on said valve rod, each cooperating, respectively, with one of said valve seats to open and close said apertures;
said valve seats being defined upon a hollow screw member which is adjustably threadedly engaged into said base, said hollow screw member being arranged to define one of said valve seats closer to said float than the other of said valve seats with a relief area being arranged on a side of said other valve seat opposite said one valve seat;
a first support plate retained within said hollow screw member for guiding engagement with said valve rod;
a spring acting between siad first support plate and said valve rod; and
a second support plate attached in said relief area, said second support plate having said valve rod supported therein and being formed with openings for passing fluid back to a fluid supply tank when fluid is being discharged through a drain outlet of said assembly.

2. A float controlled valve assembly comprising:
a tank defining a floatation area and having a tank axis;
a float with a gas exchange aperture operatively arranged in said floatation area;
a base having a channel designed therein in a direction transversely to said tank axis;
an aperture for liquid feed which permits a pressure-free feed of the contents of said tank into said channel;
a pair of apertures lying opposite each other in the direction of said tank axis for placing said channel in fluid flow connection with a tank space defined within said tank;
a valve rod coupled with said float in an articulated manner and displaceably guided in the direction of said tank axis;
a pair of valve seats, both pointing in the same direction, each arranged, respectively, to define one of said apertures;
valve sealing members arranged on said valve rod, each cooperating, respectively, with one of said valve seats to open and close said apertures; and
a hollow screw member adjustably threadedly engaged into said base and defining at least one of said valve seats, said one valve seat defining therethrough one of said apertures lying closest to said float with said valve rod being axially guided in said hollow screw member;
said assembly further comprising a first support plate arranged within said hollow screw member having said valve rod guided therein and a second support plate attached on a side of the other of said valve seats opposite said at least one valve seat directly at said channel.

3. A float controlled valve assembly comprising:
a tank defining a floatation area and having a tank axis;
a float with a gas exchange aperture operatively arranged in said floatation area;
a base having a channel designed therein in a direction transversely to said tank axis;
an aperture for liquid feed which permits a pressure-free feed of the contents of said tank into said channel;
a pair of apertures lying opposite each other in the direction of said tank axis for placing said channel in fluid flow connection with a tank space defined within said tank;
a valve rod coupled with said float in an articulated manner and displaceably guided in the direction of said tank axis;
a pair of valve seats, both pointing in the same direction, each arranged, respectively, to define one of said apertures;
valve sealing members arranged on said valve rod, each cooperating, respectively, with one of said valve seats to open and close said apertures; and
a hollow screw member adjustably threadedly engaged into said base and defining at least one of said valve seats, said one valve seat defining therethrough one of said apertures lying closest to said float with said valve rod being axially guided in said hollow screw member;
said assembly further comprising a support plate arranged within said hollow screw member having said valve rod guided therein and a compression spring actively engaged between said support plate and said one sealing member arranged to cooperate with said one valve seat defining said one aperture closest to said float.

4. An assembly according to claim 3, further comprising a second support plate attached on a side of the other of said valve seats opposite said at least one valve seat directly at said channel.

* * * * *